3,168,492
POLYPROPYLENE STABILIZED WITH 3,5-DI-TERT-BUTYL-4-HYDROXYBENZOIC ACID OR ANHYDRIDE
Marshall E. Doyle, Alameda, Gunter S. Jaffe, Oakland, Edgar J. Smutny, San Francisco, and Paul H. Williams, Orinda, Calif., assignors to Shell Oil Company, New York, N.Y., a corporation of Delaware
No Drawing. Filed Feb. 13, 1961, Ser. No. 88,601
3 Claims. (Cl. 260—45.85)

This invention relates to novel stabilized polymeric compositions and to their preparation. More particularly, it relates to polyolefin compositions stabilized against actinic degradation.

It is known that actinic radiation, particularly in the near ultraviolet region, has a deleterious effect on both the appearance and properties of organic polymers. For example, normally colorless or light-colored polyesters yellow on exposure to sunlight, as do such cellulosics as cellulose acetate. Polystyrene discolors and cracks, with accompanying loss of its desirable physical properties when exposed to actinic light, while vinyl resins, such as vinyl chloride and vinyl acetate spot and degrade. The rate of air oxidation of polyolefins such as polyethylene and polyproylene is materially accelerated by ultravoilet light. Such compounds as the benzophenones have been used to stabilize the polymers against deterioration, but introduction of these compounds into the compositions creates additional problems such as, for example, that of undesirable color.

It is an object of the present invention to provide novel actinic light-stable plastic compositions. Another object of the invention is the provision of a process for preparing such stable plastic compositions. Polyolefin compositions stabilized against degradation by utraviolet light and oxidative deterioration are yet another object of this invention, as are plastics containing a novel actinic light stabilizer. Other objects will be apparent from the following description of the invention.

These objects are accomplished by the plastic composition which comprises an organic polymeric material normally subject to actinic degradation containing a stabilizing amount of a compound selected from the group consisting of 3,5-dialkyl-4-hydroxybenzoic acid, at least one of the alkyl groups being branched on the alpha carbon atom, the anhydride thereof, the acid halide thereof, and esters thereof.

The compositions of the invention are in general solid macromolecular products which may be transparent, white or light-colored, or colored. They comprise essentially a solid high polymer, preferably having a molecular weight in excess of about 500, which in unstabilized formulations deteriorates upon prolonged exposure to actinic radiation. By actinic radiation is meant light, principally in the near ultraviolet region of about 2500–3000 A., which produces a chemical or physical change in the irradiated target. Because in plastics these changes produce harmful rather than beneficial results, the irradiation tends to shorten the useful life of the polymer.

The high polymer stabilized may be any solid organic polymer in which such degradation occurs. Typical of such polymers are the vinylic resins, such as the polyvinyl halides, particularly polyvinyl chloride, the polyvinyl esters, such as polyvinyl acetate, and copolymers thereof; the polyvinyl acetals, such as polyvinyl butyral; and the polyvinyl benzenes, such as polymerized styrene, divinyl benzenze, vinyl toluene, and their copolymers. Also falling into this general class are the polyacrylates, such as polymerized methyl or ethyl acrylate; and the polymerized methacrylates, e.g., methyl methacrylate, ethyl methacrylate; and copolymers of such compounds.

Another class of resinous materials susceptible to ultraviolet degradation are the cellulose plastics, including such esters as cellulose acetate, cellulose propionate, cellulose butyrate, and cellulose acetate butyrate; cellulose nitrate and the like.

Polyesters, particularly those prepared by the reaction of a dihydric alcohol and a dibasic carboxylic acid, are also included in the resin compositions of the invention. Exemplary polyesters are those prepared from such glycols as ethylene or propylene glycol and such acids as terephthalic acid, isophthalic acid, or adipic or azelaic acids; maleic or fumaric acid; or phthalic anhydride. These resins tend to yellow severely on exposure to sunlight.

The preferred class of plastics in the compositions of the invention are the polyolefins. The polymers of alpha-olefins stabilized by the compounds of the invention are those normally solid hydrocarbon polymeric materials which are obtained by polymerizing such monoolefins as ethylene; propylene; butene-1; pentene-1; 3-methyl-butene - 1; hexene - 1; 4 -methyl-pentene - 1; 4 - methyl-hexene-1; 4,4-dimethyl-pentene-1; and the like, as well as their copolymers, e.g., ethylene-propylene copolymers and the like. Polymers of olefins having up to 8 carbon atoms are the preferred species.

Particularly preferred polymers for the compositions of this invention as those normally solid polymers of alpha-olefins having up to three carbon atoms, e.g., ethylene and propylene, and their copolymers.

The stabilized polymeric compositions of the invention are those comprising a major amount of a resin such as those described above in intimate admixture with a compound selected from the group consisting of 3,5-dialkyl-4-hydroxybenzoic acid, at least one of the alkyl groups being branched on the alpha carbon atom, the anhydride thereof, the acid halide thereof, and the esters thereof. These compounds are in general white or light-colored solids, compatible with the resins noted, and which have the considerable advantage of not discoloring or adding an undesirable color to resin compositions containing them.

The 3,5-diakyl-4-hydroxybenzoic acid described preferably has the structure

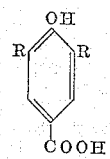

wherein each R is alkyl, at least one of the R's being branched on the alpha carbon atom, i.e., is secondary or tertiary. The most effective stabilizers are those wherein each R has from 3 to 8 carbon atoms. Representative acids include 3-methyl-5-isopropyl-4-hydroxybenzoic acid; 3-ethyl-5-tert-butyl-4-hydroxybenzoic acid; 3-pentyl-5-tert-octyl-4-hydroxybenzoic acid, and the like.

Preferred stabilizers are those wherein each of the substituents R is branched on the alpha carbon atom.

Exemplary of such compounds are 3,5-diisopropyl-4-hydroxybenzoic acid; 3-isopropyl-5-tert-butyl-4-hydroxybenzoic acid; 3,5-di-tert-butyl-4-hydroxybenzoic acid; 3-cyclohexyl-5-tert-butyl-4-hydroxybenzoic acid; 3,5-dicyclo-pentyl-4-hydroxybenzoic acid; and 3,5-di-tert-octyl-4-hydroxybenzoic acid. The most effective members of these compounds are those wherein each R is a tertiary alkyl having up to 8 carbon atoms, typified by 3,5-di-tert-butyl-4-hydroxybenzoic acid. These acids may be prepared by oxidation of the corresponding aldehyde, see Yohe et al., J. Org. Chem., 1289 (1956).

The anhydrides of these acids are also effective actinic radiation stabilizers in the plastic compositions of the invention. These anhydrides have the structure

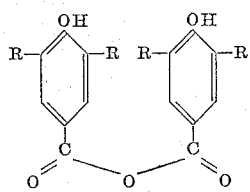

wherein each R has the significance noted above, at least one R on each aromatic nucleus being branched on the alpha carbon atom. Representative of these anhydrides is that of 3,5-di-tert-butyl-4-hydroxybenzoic acid.

The esters of these acids are characterized not only by superior actinic radiation stabilizing properties, but also by lower volatility than that of the acids from which they are derived. The esters are those wherein the acid moiety is that of an acid of the type described above, and the ester moiety is that of a hydrocarbon hydroxylic compound, preferably having up to three hydroxyl groups.

One important class of esters is that made up of the 3,5-dialkyl-4-hydroxybenzoic acid esters of monohydroxy alkanols. Preferred alkanols are those having from 1 to 20 carbon atoms. These esters have the structure

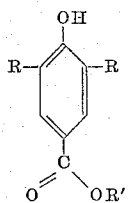

wherein each R has the above significance, and R' is alkyl or cyclo-alkyl having up to 20 carbon atoms. Representative esters of this type include methyl 3,5-diisopropyl-4-hydroxybenzoate; ethyl 3,5-di-tert-butyl-4-hydroxybenzoate; cyclohexyl 3-isopropyl-5-tert-butyl-4-hydroxybenzoate; lauryl 3,5-di-tert-octyl-4-hydroxybenzoate; stearyl 3,5-di-tert-amyl-4-hydroxybenzoate; dodecyl 3,5-di-tert-heptyl-4-hydroxybenzoate; and the like.

Another important class of esters is that consisting of the 3,5-dialkyl-4-hydroxybenzoic acid esters of alkane or aromatic polyols. Such polyols may have up to 20 carbon atoms, but more conveniently have from 2 to 10 carbon atoms, and may have up to 6 hydroxy groups, e.g., pentaerythritol, trimethylol ethane, sorbitol. Preferred are those of alkylene glycols having up to about 10 carbon atoms. These compounds have the structure

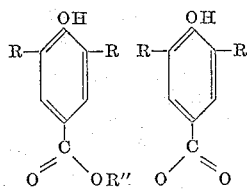

where each R has the significance noted above, and R'' is alkylene. Typical diesters are those of ethylene glycol; propylene glycol; hexylene glycol; 1,5-pentanediol; and the like; particularly preferred is propane-1,3-di(3,5-di-tert-butyl-4-hydroxybenzoate). The triesters of alkane triols having up to 10 carbon atoms, e.g., 1,2,6-hexanetriol, are also effective stabilizers. A typical ester of this type is pentane-1,3,5-tri(3,5-di-tert-amyl-4-hydroxybenzoate). Another useful relatively non-volatile stabilizer is pentaerythrityl tetra(3,5-diiso-propyl-4-hydroxybenzoate), as well as sorbityl hexa-(3,5-di-tert-butyl-4-hydroxybenzoate).

Also effective light stabilizers in the plastic compositions of the invention are the 3,5-dialkyl-4-hydroxybenzoic acid esters of aromatic polyols. Preferred esters are those wherein the polyols are mononuclear compounds wherein each of the hydroxyl groups is directly connected to a ring carbon atom. Typical polyols include phenol, the xylenols, durenol, the cresols, p-tert-butylphenol; hydroquinone; 3,5-dimethyl hydroquinone; resorcinol; and phloroglucinol. Also effective, however, are the esters of the naphthols, e.g., alpha-naphthol; beta-naphthol; alpha-methyl naphthol; and the like. In addition to the hydroxyl groups, these compounds may have such other substituents as alkyl groups, preferably those having up to 10 carbon atoms. These compounds may be generally represented by the structure

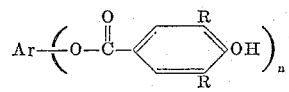

wherein Ar is an aromatic hydrocarbon nucleus, preferably having no more than twelve carbon atoms, each R has the significance noted above, and n is an integer from 1 to 3. However, also effective are esters of aromatic alcohols such as benzyl alcohol, where the hydroxy group is not connected to the ring.

Representative of these compounds are p-octylphenyl 3,5-di-tert-butyl-4-hydroxybenzoate; 2',4'-dimethylphenyl 3,5-di-tert-amyl-4-hydroxybenzoate; naphthyl 3,5-diisopropyl-4-hydroxybenzoate; phenyl 3,5-di-tert-octyl-4-hydroxybenzoate; naphthyl 1,4-di(3,5-di-tert-butyl-4-hydroxybenzoate; and benzene 1,3,5-tri(3,5-di-tert-butyl-4-hydroxybenzoate).

The esters are readily prepared by reaction of the acids described with the alcohols noted, preferably in liquid phase and in the presence of an esterification catalyst, such as sulfuric acid.

The acid halides of the acids described are the halide derivatives obtained by replacing the carboxylic hydroxyl group of the acid with a halogen atom. They will preferably have the general formula

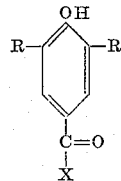

wherein each R has the above meaning and X is a halogen atom. Typical acid halides include 3,5-diisopropyl-4-hydroxybenzoyl chloride; 3-methyl-5-sec-butyl-4-hydroxybenzoyl bromide; 3,5-di-cyclohexyl-4-hydroxybenzoyl fluoride; 3,5-di-tert-butyl-4-hydroxybenzoyl iodide; and 3,5-di-tert-octyl-4-hydroxybenzoyl chloride. Most preferred of the halides are the benzoyl chlorides.

The stabilizer is readily incorporated in the resin to afford a stable homogeneous composition. For example, mechanical methods, such as Banburying or hot milling, may be employed to combine the stabilizer with the solid resin. Where the polymer is prepared from a liquid monomer, as in the case of styrene or methyl methacrylate, the stabilizer may be dispersed or dissolved in the monomer prior to polymerization or curing.

Only sufficient stabilizer is required to stabilize the polymer against actinic degradation. Depending on the nature of the polymer, the particular stabilizer employed, and the severity of exposure of the resulting composition, from about 0.001% to 10% by weight of the stabilizer, based on the polymer, will be required. In most cases, however, from about 0.1% to about 1% on the same basis will be sufficient.

In addition to the actinic stabilizers described, the plastic compositions of the invention may contain other additives such as plasticizers, pigments, fillers, dyes, glass or other fibers, thermal antioxidants, and the like. For example, in most applications, it will be desirable to incorporate into the resin compositions sufficient thermal antioxidant to protect the plastic against thermal and oxidative degradation. The amount of antioxidant required will be comparable to that of the actinic stabilizer, i.e., from about 0.001% to about 10% by weight, based on the polymer. Representative of such antioxidants are amino compounds such as diisopropanolamine; p-phenylene diamine and durene diamine; phosphite esters, such as triphenyl phosphite and dibutyl phosphite and alkyl aryl phosphites such as dibutyl phenyl phosphite, and the like.

The best results are obtained with the preferred class of thermal antioxidants, the hindered phenols. These compounds have been found to provide the best thermal stabilization with the least attendant discoloration in the compositions of the invention. These phenols may be mononuclear, as in the case of 2,6-di-tert-butylphenol; 2,6-di-tert-butyl-4-methylphenol; 2,6-diisopropyl-4-methoxymethylphenol; 2,6-di-tert-butyl-4-hydroxymethylphenol; and 2,4-dimethyl-6-tert-butyl-phenol; or they may be polynuclear. Particularly preferred polynuclear phenols are the biphenols, such as 3,3',5,5'-tetra-tert-butyl-biphenol and 3,3',5,5'-tetraisopropyl-biphenol; and such bisphenols as bis(3,5-di-tert-butyl-4-hydroxyphenyl)methane; bis(3-tert-butyl-5-methyl-2-hydroxyphenyl)methane; and bis(3-tert-butyl-5-methyl - 2 - hydroxyphenyl) sulfide. Other polynuclear phenolic compounds which are effective antioxidants include the bis(3,5-dialkyl-4-hydroxybenzyl) durenes, such as bis(3,5-di-tert-butyl-4-hydroxybenzyl) durene; the polyphenolic phenols, such as 2,4,6-tris(3,5-di-tert-amyl-4-hydroxybenzyl) phenol; such polyphenolic benzenes as 1,3,5-trimethyl-2,4,6-tris(3,5-di-tert-butyl-4-hydroxybenzyl)benzene; and the di(3,5-dialkyl-4-hydroxybenzyl) polynuclear aromatics, such as 9,10-bis(3,5-di-tert-butyl-4-hydroxybenzyl) anthracene and 1,4-bis(3,5-diisopropyl-4-hydroxybenzyl)naphthalene.

Plastic compositions consisting essentially of a solid organic polymeric material of the type described and containing stabilizing amounts of the 3,5-dialkyl-4-hydroxybenzoic actinic stabilizer and of the phenolic antioxidants described are characterized by extreme physical and chemical durability at elevated temperatures and extended exposures to ultraviolet radiation. Furthermore, when light-colored or transparent resinous products of these compositions are prepared, they do not discolor under even the most severe conditions of use.

The following examples will illustrate the nature and advantages of the compositions of the invention. It should be understood, however, that the examples are merely illustrative, and are not to be regarded as limitations to the appended claims, since the basic teachings thereof may be varied at will, as will be understood by one skilled in the art.

EXAMPLES

A series of plastic compositions were prepared by milling samples of polypropylene for five minutes at 190° C. with samples of the following compounds. From these compositions, compression molded films of about 5 mil thickness were formed, and these films were exposed to ultraviolet irradiation in a modified Atlas Weatherometer.

In the modified instrument, the conventional arc light source was supplemented with eight fluorescent ultraviolet light sources. All film samples passed within a quarter inch of the light sources. It has been found that in this accelerated test, conditions are about eight times as stringent as in the unmodified Weatherometer.

The samples were periodically tested by bending through 180°. The number of days required before each film broke on bending is shown in the following table.

The samples tested each contained 0.5% w. of the candidate stabilizer. The samples also contained 0.1% w. of an antioxidant, bis(3,5-di-tert-butyl-4-hydroxybenzyl) durene. Two different types of polypropylene were tested.

Table I

| Additive | Sample 1 | Sample 2 |
| --- | --- | --- |
| None | 4-4.5 | 4.5 |
| 3,5-di-tert-butyl-4-hydroxybenzoic acid | 10.5 | 14 |
| 3,5-di-tert-butyl-4-hydroxybenzoic acid anhydride | 9.5 | |
| 2',4'-di-tert-butylphenyl 3,5-di-tert-butyl-4-hydroxybenzoate | 10 | 20.5 |
| Lauryl 3,5-di-tert-butyl-4-hydroxybenzoate | 8.5 | 13.5 |
| p-Octyl phenyl 3,5-di-tert-butyl-4-hydroxybenzoate | | 20.5 |
| 1,3-propane-di(3,5-di-tert-butyl-4-hydroxybenzoate) | 14 | 14 |

Also effective are the 3,5-di-tert-butyl-4-hydroxybenzoyl chloride and the triester of trimethylolethane. For example, a sample of polypropylene containing 0.5% w. 3,5-di-tert-butyl-4-hydroxybenzoyl chloride and 0.1% w. of a thermal antioxidant, bis(3,5-di-tert-butyl-4-hydroxybenzyl)durene was light-stable under the conditions of outdoor exposure test for 13 weeks to Arizona sunshine. In contrast, a sample containing only the thermal antioxidant lasted but two weeks under the same conditions. Similar results are obtained when these compounds are incorporated in polyethylene.

Samples of polystyrene containing candidate compounds were also tested. The samples were prepared by dry-mixing the desired quantity of stabilizer with high-impact polystyrene containing 0.1% w. 2,6-di-tert-butyl-4-methyl phenol. The samples were then extruder-blended, and samples tested in an unmodified Atlas Fadeometer, the light source of which is a carbon arc. The samples were irradiated for 100 hours, and their color visually evaluated at the end of that time. Samples are rated in order of increasing discoloration, the best possible rating being 1.

Table II

Stabilizer: Visual rating
  3,5-di-tert-butyl-4-hydroxybenzoic acid _____ 3
  2,6-di-tert-butyl-4-methyl phenol (total of 0.2% w.) _____ 5

Similar results are obtained when these compounds are tested in polymethyl methacrylate.

Of the compositions of the invention, as noted above, the preferred are polymeric alpha-olefins. Of these, the most preferred are polyolefins containing a tertiary carbon atom, i.e., having the configuration

in the polymer chain, and these polymers may be isotactic or, less desirably, atactic. Exemplary of the former class is the preferred embodiment, polypropylene.

Incorporation of the stabilizer in the polypropylene may be conducted in a variety of ways. Thus, the stabilizer may be milled into the resin, as in the above examples, or it may be incorporated in the resin slurry prior to removal of the solvent. The latter method is preferable as affording maximum protection in continuous production of polypropylene.

We claim as our invention:

1. The plastic composition comprising polypropylene containing a stabilizing amount of a compound selected from the group consisting of 3,5-di-tert-butyl-4-hydroxybenzoic acid and 3,5-di-tert-buty-4-hydroxybenzoic acid anhydride.

2. The plastic composition comprising polypropylene containing a stabilizing amount of 3,5-di-tert-butyl-4-hydroxybenzoic acid.

3. The plastic composition comprising polypropylene containing a stabilizing amount of 3,5-di-tert-butyl-4-hydroxybenzoic acid anhydride.

References Cited by the Examiner

UNITED STATES PATENTS

| | | | |
|---|---|---|---|
| 2,157,068 | 5/39 | Carruthers et al. | 260—45.85 |
| 2,464,250 | 3/49 | Moll et al. | 260—45.85 |
| 2,635,089 | 4/53 | Anderson | 260—45.85 |
| 2,956,982 | 10/60 | McCall et al. | 260—45.85 |
| 2,985,617 | 5/61 | Salyer et al. | 260—45.7 |
| 3,085,003 | 4/63 | Morris | 260—45.95 |

FOREIGN PATENTS

| | | |
|---|---|---|
| 596,935 | 4/60 | Canada. |
| 1,226,352 | 2/60 | France. |

OTHER REFERENCES

"Autoxidation and Antioxidants" by Lundberg, volume II, 1962, pages 931–938 relied upon (footnoted references of these pages are cited on pages 981–984), Interscience Publishers.

LEON J. BERCOVITZ, *Primary Examiner.*

A. D. SULLIVAN, JAMES A. SEIDLECK, *Examiners.*